(12) United States Patent
Malki

(10) Patent No.: US 6,412,690 B1
(45) Date of Patent: Jul. 2, 2002

(54) CREDIT CARD SECURITY METHOD AND CREDIT CARD

(76) Inventor: Abdo Malki, 1005 Pepper Hill Rd., Pasadena, CA (US) 91107

(*) Notice: Subject to any disclaimer, the term of this patent is extended or adjusted under 35 U.S.C. 154(b) by 0 days.

(21) Appl. No.: 09/544,240

(22) Filed: Apr. 7, 2000

(51) Int. Cl.[7] ............................................... G06K 05/00
(52) U.S. Cl. ........................................ 235/380; 705/18
(58) Field of Search ............................. 235/375, 382.5, 235/380, 493; 705/18, 44

(56) References Cited

U.S. PATENT DOCUMENTS

| | | | |
|---|---|---|---|
| 4,641,017 A | | 2/1987 | Lopata |
| 4,643,453 A | | 2/1987 | Shapiro et al. |
| 4,667,087 A | | 5/1987 | Quintana |
| RE34,096 E | * | 10/1992 | Golightly ............... 235/380 |
| 5,163,098 A | | 11/1992 | Dahbura |
| 5,251,259 A | * | 10/1993 | Mosley ................. 235/380 |
| 5,365,046 A | | 11/1994 | Haymann |
| 5,397,881 A | | 3/1995 | Mannik |
| 5,446,273 A | | 8/1995 | Leslie |
| 5,538,291 A | | 7/1996 | Gustafson |
| 5,661,284 A | * | 8/1997 | Freeman et al. ........... 235/375 |
| 6,149,519 A | * | 11/2000 | Osaki et al. .............. 463/1 |

* cited by examiner

Primary Examiner—Mark Tremblay
(74) Attorney, Agent, or Firm—Jack Lo

(57) ABSTRACT

In the present credit card security method, a credit card company requests a person applying for a credit card account to submit a name and a birth month. The credit card company associates a credit card with essential information, prints the credit card, and issues the credit card to the person. The essential information comprises an account number, the person's name, and an expiration date comprising an expiration month and an expiration year. The expiration month is the birth month of the person. The credit card is printed with the account number, name, and expiration year, but not the expiration month. The credit card company still requires the correct expiration month to be submitted before authorizing a credit card transaction. The cardholder can verbally provide the expiration month to a sales clerk in a telephone or point-of-sale transaction, and can personally enter it into a computer in an Internet transaction. An unauthorized user with possession of the credit card cannot acquire the expiration date and therefore cannot complete a transaction. In a second embodiment, a beginning date is also associated with the card to define a valid period in combination with the expiration date. The beginning year is shown on the card with the expiration year, but the beginning month is not shown. The beginning month is also the cardholder's birth month.

10 Claims, 1 Drawing Sheet

CREDIT CARD SECURITY METHOD AND CREDIT CARD

BACKGROUND OF THE INVENTION

1. Field of the Invention

This invention relates generally to credit cards.

2. Prior Art

A credit card is typically embossed with three items of essential information: an account number, a cardholder's name, and an expiration date that includes the month and year of expiration. An example of an expiration date is June 1998. Some cards also show a beginning date in combination with the expiration date to represent a valid period, wherein the beginning month and ending month are usually the same. For example, February 1996 thru February 1998. The expiration date or valid period is selected by the issuing bank or institution.

A sales slip for a credit card sale is also printed with the same essential information. Credit card transactions can be made through the telephone or the Internet by using this information. Since the essential information is shown on credit cards and sales slips, cardholders are exposed to fraudulent use of their accounts whenever their cards or sales slips fall into the wrong hands.

Various improved credit cards and methods are known in the prior art for preventing credit card fraud. U.S. Pat. No. 5,538,291 to Gustafson discloses a credit card which must be enabled by a separate mechanical key lock. U.S. Pat. No. 5,446,273 to Leslie discloses a credit card with encrypted personal information on the cardholder. U.S. Pat. No. 5,397,881 to Mannik discloses a credit card magnetically written with multiple expiration dates. U.S. Pat. No. 5,365,046 to Haymann discloses a credit card associated with a personal identification number, which must be verified before a transaction can be completed. U.S. Pat. No. 5,163,098 to Dahbura discloses a credit card system which uses an encryption algorithm to generate a first encoded text from the card number and a password supplied by the user. The card user is verified by comparing the first encoded text with an encoded text recorded on the card. U.S. Pat. No. 4,667,087 to Quintana discloses a credit card with a keyboard and a microprocessor. U.S. Pat. No. 4,643,453 to Shapiro et al. discloses a credit card with auxiliary characters and corresponding dates at which each of the characters should be used. U.S. Pat. No. 4,641,017 to Lopata discloses a credit card with a hologram.

All the prior art cards and methods require substantial changes in the structure of the card, and/or the method of conducting transactions. Since the introduction of a new card and/or transaction method require the participation of all merchants, banks, and users, the obstacle to widespread adoption is immense.

OBJECTIVES OF THE INVENTION

Accordingly, the objectives of the present credit card security method are:

- to prevent fraudulent transactions that may result from unauthorized possession of lost or stolen credit cards or sale slips; and
- to require very minor changes to the credit cards and transaction method to substantially reduce the obstacle to widespread adoption.

Further objectives of the present invention will become apparent from a consideration of the drawings and ensuing description.

BRIEF SUMMARY OF THE INVENTION

The present credit card security method comprises establishing a credit card account with an account number, a cardholder's name, and an expiration date comprising an expiration month and an expiration year. The expiration month is the cardholder's birth month, and the expiration year is selected by the issuing institution of the card. The account number, cardholder's name, and expiration year are displayed on the credit card and sale slip. Although the expiration month is not displayed on the credit card or the sale slip, it is still required for completing a credit card transaction. The cardholder can verbally provide the expiration month to a sales clerk, and can personally enter it into a computer in an Internet transaction. Although the expiration month must be memorized by the cardholder, it is easy to remember because it is the cardholder's birth month. The method merely involves deleting an item of information from the credit card and sale slip, so that it is extremely easy to implement. An unauthorized user with possession of the credit card or sale slip cannot acquire the expiration date and therefore cannot complete a transaction. In a second embodiment, a beginning date is also associated with the card to define a valid period in combination with the expiration date. The beginning year is shown on the card with the expiration year, but the beginning month is not shown. The beginning month is also the cardholder's birth month.

Figure 1:
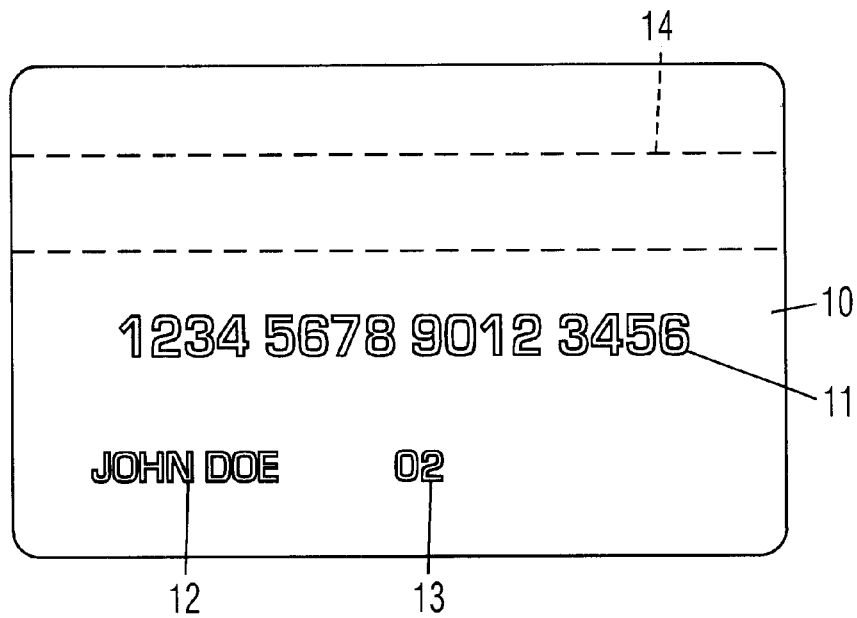
FIG. 1 is a front view of a credit card according to the present credit card security method.

| DRAWING REFERENCE NUMERALS | |
| --- | --- |
| 10. Credit Card | 11. Account Number |
| 12. Name | 13. Expiration Year |
| 14. Magnetic Strip | 15. Beginning Year |

DETAILED DESCRIPTION OF THE INVENTION

In the present credit card security method, a credit card company requests a person applying for a credit card account to submit a name and a birth month. The credit card company associates a credit card with essential information, prints the credit card, and issues the credit card to the person. The essential information comprises an account number, the person's name, and an expiration date comprising an expiration month and an expiration year. The expiration month is the birth month of the person. The expiration year is preferably selected by the credit card company.

A credit card 10 in accordance with the present method is shown in FIG. 1. Account number 11, name 12, and expiration year 13 are displayed on credit card 10. The account number, name, and expiration year may also be displayed on a sale slip. The particular number, name, and expiration year shown are only exemplary. The expiration month is not displayed on the credit card, and preferably also not on the sale slip. An electronically-readable medium or magnetic strip 14 on the back of the credit card is recorded with the account number and preferably also the name and expiration year, but not with the expiration month. Alternatively, magnetic strip 14 may be replaced with other another type of electronically-readable medium, such as a memory chip or microprocessor.

Although the expiration month is not displayed on the credit card or the sale slip, the credit card company still requires the correct expiration month to be submitted before authorizing a credit card transaction. The expiration month must be memorized by the person or cardholder, but it is easy to remember because it is the cardholder's birth month. Since the prior art telephone transaction method already involves verbal transfer of the essential information, including the expiration month, from the cardholder to the sales clerk; and the prior art Internet transaction method already requires the cardholder to manually enter the essential information, including the expiration month, into a computer, the present security method can be integrated into such transactions without any change to the prior art transaction methods. This is an advantage which can significantly improve the rate of adoption for this security method.

A point-of-sale credit card transaction, such as that in a store, can be carried out by entering the expiration month manually into a credit card reader or cash register which is arranged to receive a manually entered expiration date. The cardholder can personally enter the expiration month, or tell it to the store clerk who would enter it. The sale slip printer is preferably arranged to not print the expiration month on the sale slip. Alternatively, the expiration month can be handwritten on the sale slip, or a point-of-sale credit card transaction can be carried out without using the expiration month.

Alternatively, the expiration month may be recorded onto the magnetic strip to avoid requiring any change in the prior art point-of-sale credit card transaction method that uses a card reader. The expiration month is still not displayed on the card. An unauthorized person without the ability to extract the expiration month from the magnetic strip still cannot use the card over the telephone or Internet. If the expiration month is stored in the electronically-readable medium, it may be encrypted for increased security.

Figure 2:
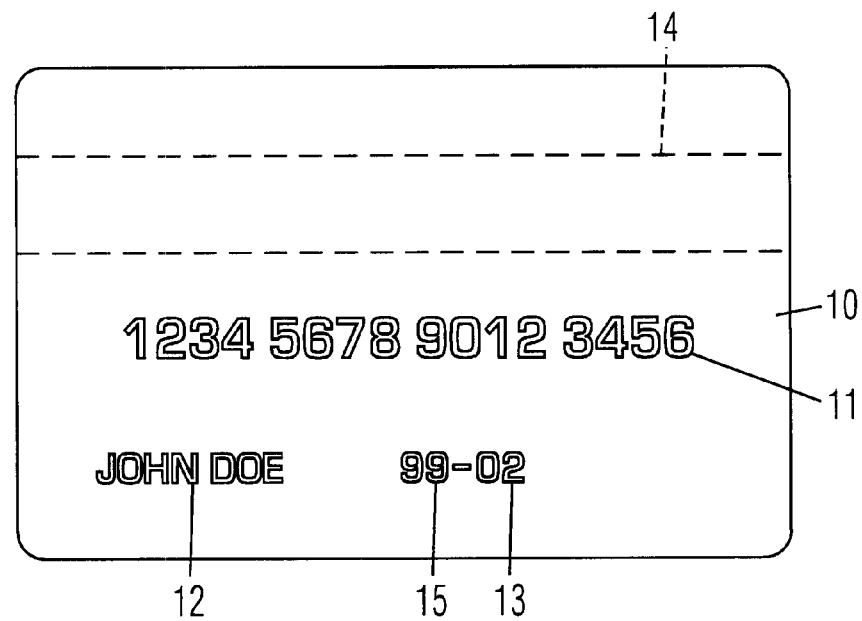
FIG. 2 is a front view of an alternative embodiment of the credit card.

In an alternative embodiment, a beginning date is also associated with the card to define a valid period in combination with the expiration date. The beginning date includes a beginning month which is the cardholder's birth month, and a beginning year which is selected by the issuing institution. As shown in FIG. 2, beginning year 15 is shown preceding expiration year 13 on card 10.

Accordingly, the present credit card security method merely involves not displaying the expiration month on the credit card and sale slip, so that it is extremely easy to implement. An unauthorized user with possession of the credit card or sale slip cannot acquire the expiration date and therefore cannot complete a transaction. The ease of implementation makes widespread adoption much easier to achieve.

Although the above description is specific, it should not be considered as a limitation on the scope of the invention, but only as an example of the preferred embodiment. Many variations are possible within the teachings of the invention. Therefore, the scope of the invention should be determined by the appended claims and their legal equivalents, not only by the examples given.

I claim:

1. A credit card security method, comprising:

requesting a person applying for a credit card account to submit a name and a birth month;

associating a credit card with an account number, said name, and an expiration date comprising an expiration month and an expiration year;

using said birth month of said person for said expiration month; and visibly marking said credit card with said account number, said name, and said expiration year, but not said expiration month for security.

2. The credit card security method of claim 1, further including recording on a magnetic strip on said credit card said account number, but not said expiration month for security.

3. The credit card security method of claim 1, further including recording on a magnetic strip on said credit card said account number and said expiration month.

4. The credit card security method of claim 1, further including associating said credit card with a beginning date which comprises a beginning month and a beginning year, and visibly marking said beginning year but not said beginning month on said credit card.

5. The credit card security method of claim 1, further including associating said credit card with a beginning date which comprises a beginning month and a beginning year, and recording on a magnetic strip on said credit card said account number, but not said beginning month and not said expiration month for security.

6. A credit card security method, comprising:

requesting a person applying for a credit card account to submit a name and a birth month;

associating a credit card with an account number, said name, and an expiration date comprising an expiration month and an expiration year;

using said birth month of said person for said expiration month;

visibly marking said credit card with said account number, said name, and said expiration year, but not said expiration month for security; and requiring submission of said expiration month before authorizing a credit card transaction.

7. The credit card security method of claim 6, further including recording on a magnetic strip on said credit card said account number, but not said expiration month for security.

8. The credit card security method of claim 6, further including recording on a magnetic strip on said credit card said account number and said expiration month.

9. The credit card security method of claim 6, further including associating said credit card with a beginning date which comprises a beginning month and a beginning year, visibly marking said beginning year but not said beginning month on said credit card, and requiring submission of said beginning month before authorizing said credit card transaction.

10. The credit card security method of claim 6, further including associating said credit card with a beginning date which comprises a beginning month and a beginning year, recording on a magnetic strip on said credit card said account number, but not said beginning month and not said expiration month for security, and requiring submission of said beginning month before authorizing said credit card transaction.

* * * * *